Jan. 22, 1929.
E. URBAN
DOUBLE GARDEN HOE
Filed June 4, 1927
1,699,933
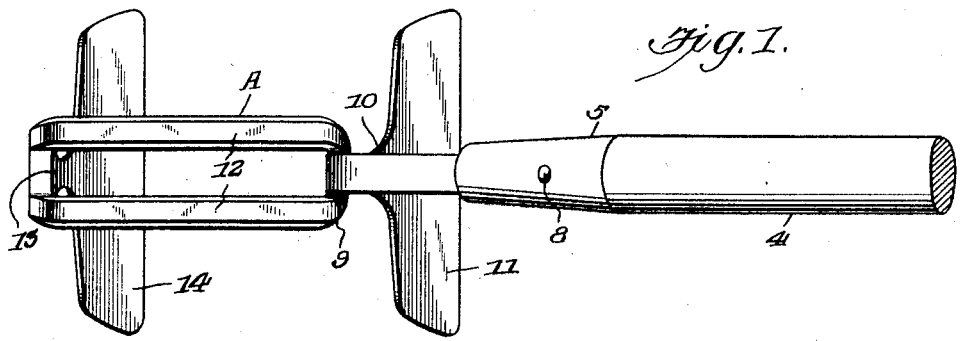
Fig. 1.
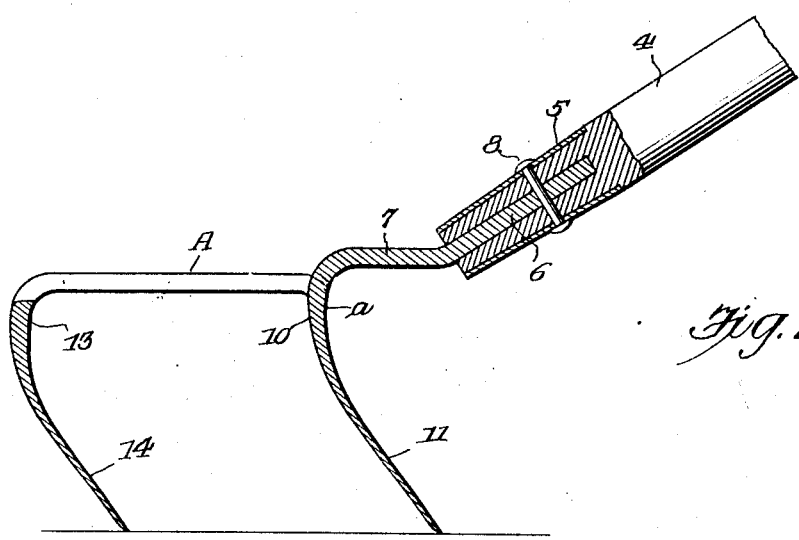
Fig. 2.
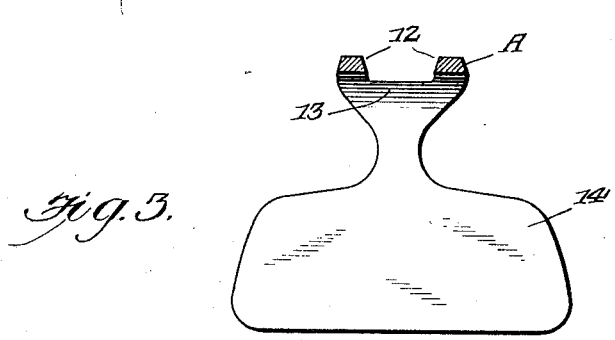
Fig. 3.
Inventor
Emil Urban,
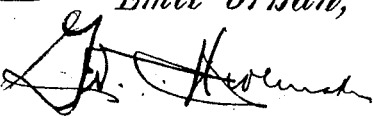
By
Attorney Patented Jan. 22, 1929.

1,699,933

UNITED STATES PATENT OFFICE.

EMIL URBAN, OF COMSTOCK, NEBRASKA.

DOUBLE GARDEN HOE.

Application filed June 4, 1927. Serial No. 196,568.

This invention relates to hoes.

One object in view is to provide a simple, durable and inexpensive hoe of a single piece of steel or other suitable metal capable of use either as a double hoe or as a single hoe as occasion may suggest, necessitates or demand.

Another object resides in the provision of an implement of the nature stated, embodying among other characteristics a double hoe including two shanks and two hoe blades, one shank and its blade being supported from the shank of the other hoe blade, and all formed of a single piece of metal with the blades disposed in parallelism one in advance of the other.

With the above and other objects in view, the invention consists in the construction and novel combination of parts hereinafter described, illustrated in the accompanying drawings, and set forth in the claims hereto appended, it being understood that various changes in the form, size and minor details of construction, within the scope of the claims, may be resorted to without departing from the spirit of the invention or sacrificing any of the advantages thereof.

In the drawings:

Figure 1 is a top plan view.

Fig. 2 is a longitudinal sectional view.

Fig. 3 is a transverse sectional view.

Referring now more particularly to the accompanying drawings, the reference character 4 indicates a handle of any suitable character and length to which my improved hoe may be secured in any suitable manner, but as shown a ferrule 5 is secured in any desired manner to the inner end of the handle 4 and in this ferrule the tang 6 of the shank 7 may be secured in any suitable manner, say for instance, by a rivet 8.

The shank 7 is broadened, as at 9, and from the point $a$ it has a downwardly and forwardly curved portion 10 having scalloped sides which merge into the flaring or curved upper edges of the relatively narrow hoe blade 11 formed with the portion 10 of the shank 7.

A second shank A extends rearwardly from the curved portion 10 at the aforesaid point $a$ and consists preferably of spaced arms 12 connected at their outer ends by the downwardly and forwardly directed curved portion 13 of the shank A. The sides of this curved portion 13 of the shank A are scalloped with said sides merging into the upper edges of the relatively narrow hoe blade 14 disposed upon a forward incline parallel with the plane of the first mentioned hoe blade 11.

From the foregoing it will be seen that my device is composed of a single piece of steel or other suitable material and includes a front blade whose shank connects with the handle and from which extends rearwardly a shank to which a second blade is secured and spaced a suitable distance from and in parallelism with the front or primary blade. The blades being inclined forwardly toward the operator, they more effectually perform their functions than if disposed perpendicularly. The sides of the portions of the shanks to which the blades are secured being scalloped, and the blades being relatively narrow, there is clearance for dirt or other matter between the upper edges of the blades, and the shanks on opposite sides of the curved shank portions; and the working blades being relatively narrow, they are practically self-cleaning when the device is operated.

The double hoe is a handy implement, permitting one individual to do approximately the work of two, and it is very effective as a pulverizer of the ground and as a cutting tool in destroying grass and weeds. The device is so constructed that the operator can elevate the handle slightly and use the outer or secondary blade alone, if desired, to work the ground shallow and to work effectively among the finer vegetables. If desired, the handle may be lowered and the inner or primary plate positioned to work alone. Another feature characteristic of the implement is that it may be positioned with the cutting edges of the blades on the ground to dispose the handle to the view and ready grasp of the operator without stooping to the ground.

What I claim is:

1. A garden hoe comprising a shank including a downwardly and forwardly directed curved portion, a blade carried by said curved portion of the shank and inclined downwardly and forwardly, a second shank consisting of spaced members extending from the sides of the aforesaid curved portion of the first mentioned shank and terminating at its outer end in a downwardly and forwardly curved portion, a blade carried by the curved portion of the second shank and inclined in a plane substantially parallel with the plane of the first mentioned blade, and a handle secured to the first mentioned shank.

2. A garden hoe including a shank, a substantially flat blade carried by the shank and having a straight horizontal cutting edge, a second shank supported by and extending rearwardly substantially horizontal from the first-mentioned shank, and a substantially flat blade secured to the second mentioned shank and disposed in the rear of the first mentioned blade in the same parallel plane therewith and having a straight cutting edge.

3. A garden hoe tool including a shank, a blade carried by the shank and being of greater length than the width thereof with the length of the hoe running transversely of the tool, a second shank supported by and extending rearwardly from the first-mentioned shank, and a blade secured to the second mentioned shank and being of greater length than the width thereof with the length running transversely of the tool and being disposed directly in the rear of the first-mentioned blade and parallel therewith.

4. A garden hoe including a shank, a chopping blade carried by said shank, a second shank consisting of spaced arms connected to and extending rearwardly from the first mentioned shank, and a chopping blade carried by the second mentioned shank, the blades being arranged one behind the other and in parallelism in a forward inclined plane.

5. A garden hoe including a shank having a downwardly and forwardly directed portion, a blade carried by said forwardly directed portion of the shank, a second shank extending rearwardly from the said forwardly directed portion of the first mentioned shank and including spaced parallel arms connected at their outer ends by a downwardly and forwardly directed portion, and a blade secured to the last mentioned forwardly directed portion and disposed in spaced parallel relation with the first mentioned blade in the rear of the latter, both blades being disposed in a forwardly directed inclined plane.

6. A garden hoe including a shank having a downwardly and forwardly directed portion, a blade carried by said forwardly directed portion of the shank, a second shank extending rearwardly from the said forwardly directed portion of the first mentioned shank and including spaced parallel arms connected at their outer ends by a downwardly and forwardly directed portion, and a blade secured to the last mentioned forwardly directed portion and disposed in spaced parallel relation with the first mentioned blade in the rear of the latter, both blades being disposed in a forwardly directed inclined plane, the sides of said forwardly directed portions of the shanks being scalloped between the upper edges of the respective blades and respective shanks, and a handle connected to the first mentioned shank.

In testimony whereof I have hereunto set my hand.

EMIL URBAN.